(12) United States Patent
Lewis

(10) Patent No.: US 7,383,388 B2
(45) Date of Patent: Jun. 3, 2008

(54) METHOD FOR STORING DATA

(75) Inventor: Russell Lee Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 10/870,800

(22) Filed: Jun. 17, 2004

(65) Prior Publication Data
US 2005/0283580 A1   Dec. 22, 2005

(51) Int. Cl.
*G06F 12/00* (2006.01)

(52) U.S. Cl. ...................... 711/118; 711/133

(58) Field of Classification Search ............... None
See application file for complete search history.

(56) References Cited

U.S. PATENT DOCUMENTS

| | | |
|---|---|---|
| 5,091,850 A | 2/1992 | Culley |
| 5,184,320 A | 2/1993 | Dye |
| 5,214,777 A | 5/1993 | Curry, Jr. |
| 5,572,703 A | 11/1996 | MacWilliams et al. |
| 5,623,632 A | 4/1997 | Liu et al. |
| 5,784,590 A | 7/1998 | Cohen et al. |
| 5,787,478 A | 7/1998 | Hicks et al. |
| 5,809,549 A | 9/1998 | Thome et al. |
| 6,115,794 A | 9/2000 | Arimilli et al. |
| 6,453,404 B1 | 9/2002 | Bereznyi et al. |
| 6,507,892 B1 | 1/2003 | Mulla et al. |
| 6,529,240 B2 * | 3/2003 | Tan et al. ................. 348/302 |
| 6,549,448 B2 * | 4/2003 | Kang ........................ 365/145 |
| 2002/0073280 A1 | 6/2002 | Ng |
| 2005/0027798 A1 * | 2/2005 | Chiou et al. .............. 709/203 |
| 2005/0050261 A1 * | 3/2005 | Roehr et al. .............. 711/103 |

OTHER PUBLICATIONS

Jim Handy, 1993, The Cache Memory Book, pp. 14-25 pp. 55, 57; p. 153.*
IBM Corp. IBM Technical Disclosure Bulletin. "*Increasing Hit Ratios in Second Level Caches and Reducing the Size of Second Level Storage,*" by L. Liu, vol. 27, No. 1A, Jun. 1984, pp. 334-337.
IBM Corp. IBM Technical Disclosure Bulletin. "*Second-Level Shared Cache Implementation for Multiprocessor Computers with a Common Interface for the Second-Level Shared Cache and the Second-Level Private Cache,*" vol. 33, No. 11, Apr. 1991, pp. 362-365.

* cited by examiner

*Primary Examiner*—Reginald G. Bragdon
*Assistant Examiner*—Ngoc V Dinh
(74) *Attorney, Agent, or Firm*—Rabindranath Dutta; Konrad Raynes & Victor LLP (57) ABSTRACT

Provided are a method, system, and article of manufacture, wherein a first storage unit is coupled to a second storage unit. The first storage unit and the second storage unit are detected. A determination is made that the first storage unit is capable of responding to a write operation faster than the second storage unit, and that the second storage unit is capable of responding to a read operation at least as fast as the first storage unit. Data is written to the first storage unit. A transfer of the data is initiated from the first storage unit to the second storage unit. The data is read from the second storage unit, in response to a read request directed at both the first and the second storage units.

5 Claims, 7 Drawing Sheets

METHOD FOR STORING DATA

BACKGROUND

1. Field

The disclosure relates to a method, system, and article of manufacture for storing data.

2. Background

A cache is a high-speed storage mechanism that can be either a reserved section of main memory or an independent high-speed storage device. Computational platforms may use memory caching or disk caching.

A memory cache, also referred to as Random Access Memory (RAM) cache, may be a portion of memory made of high-speed static RAM (SRAM) instead of the slower and less expensive dynamic RAM (DRAM) used for main memory. Memory caching is effective because many programs access the same data or instructions over and over. By keeping as much of information that is likely to be accessed in SRAM, a computational platform may avoid accessing the slower DRAM.

Certain memory caches may be built into the architecture of microprocessors. Such internal memory caches may be referred to as Level 1 (L1) caches. Certain microprocessors are also coupled with external cache memory, referred to as Level 2 (L2) caches. In certain computational platforms, the L1 and L2 caches are located between the Central Processing Unit (CPU) and the main memory. Like L1 caches, L2 caches may be composed of SRAM but may have a larger storage capacity than L1 caches.

Disk caching may operate under principles that are similar to as memory caching, but instead of using high-speed SRAM a disk cache may be implemented in the main memory. In certain systems, data that is likely to be accessed frequently is stored in the disk cache implemented in the main memory. When a program needs to access data from the disk, the program may first check the disk cache to determine whether the data is present in the disk cache. Disk caching can improve the performance of applications, because accessing a byte of data in main memory can be much faster than accessing a byte of data in a hard disk. Other techniques of caching beyond memory caching and disk caching may be used in computing platforms.

SUMMARY OF THE DESCRIBED EMBODIMENTS

Provided are a method, system, and article of manufacture, wherein a first storage unit is coupled to a second storage unit. The first storage unit and the second storage unit are detected. A determination is made that the first storage unit is capable of responding to a write operation faster than the second storage unit, and that the second storage unit is capable of responding to a read operation at least as fast as the first storage unit. Data is written to the first storage unit. A transfer of the data is initiated from the first storage unit to the second storage unit. The data is read from the second storage unit, in response to a read request directed at both the first and the second storage units.

In certain additional embodiments, the data in the first storage unit is deleted after the data has been transferred to the second storage unit, wherein space released by deleting the data in the first storage unit is used for writing additional data in the first storage unit.

In yet additional embodiments, an address bus and a data bus couples the first storage unit to the second storage unit. An address corresponding to the data is loaded in the address bus. The data is loaded in the data bus. The address and the data are transferred via the address bus and the data bus from the first storage unit to the second storage unit. In further embodiments, the first and second storage units comprise a plurality of address testers and a plurality of cache lines, wherein transferring the address and the data comprises moving the address from a first cache line in the first storage unit to a second cache line in the second storage unit, moving the data from the first cache line in the first storage unit to the second cache line in the second storage unit, and deleting the data in the first cache line.

In further embodiments, the first storage unit comprises a plurality of address testers and a plurality of cache lines, wherein the first storage unit is coupled to a processor via an address bus and a data bus, and wherein writing data to the first storage unit comprises loading an address corresponding to the data in the address bus, loading the data in the data bus, and writing the data and the address in at least one cache line, wherein an address tester is capable of transmitting the data and the address to the at least one cache line.

In yet additional embodiments, the first storage unit and the second storage unit comprise a cache that is capable of coupling a processor to a main memory. The data is moved from the cache to the main memory. In response to a read miss from the cache, the data is read from the main memory.

In additional embodiments, the first and second storage units comprise a cache, wherein the first and second storage units comprise one cache level. In certain embodiments the cache is an L1 cache, wherein the first and the second storage units are implemented by static random access memory.

In yet additional embodiments, the first and second storage units comprise a cache, and the second storage unit is larger and is capable of storing a greater amount of data than the first storage unit.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
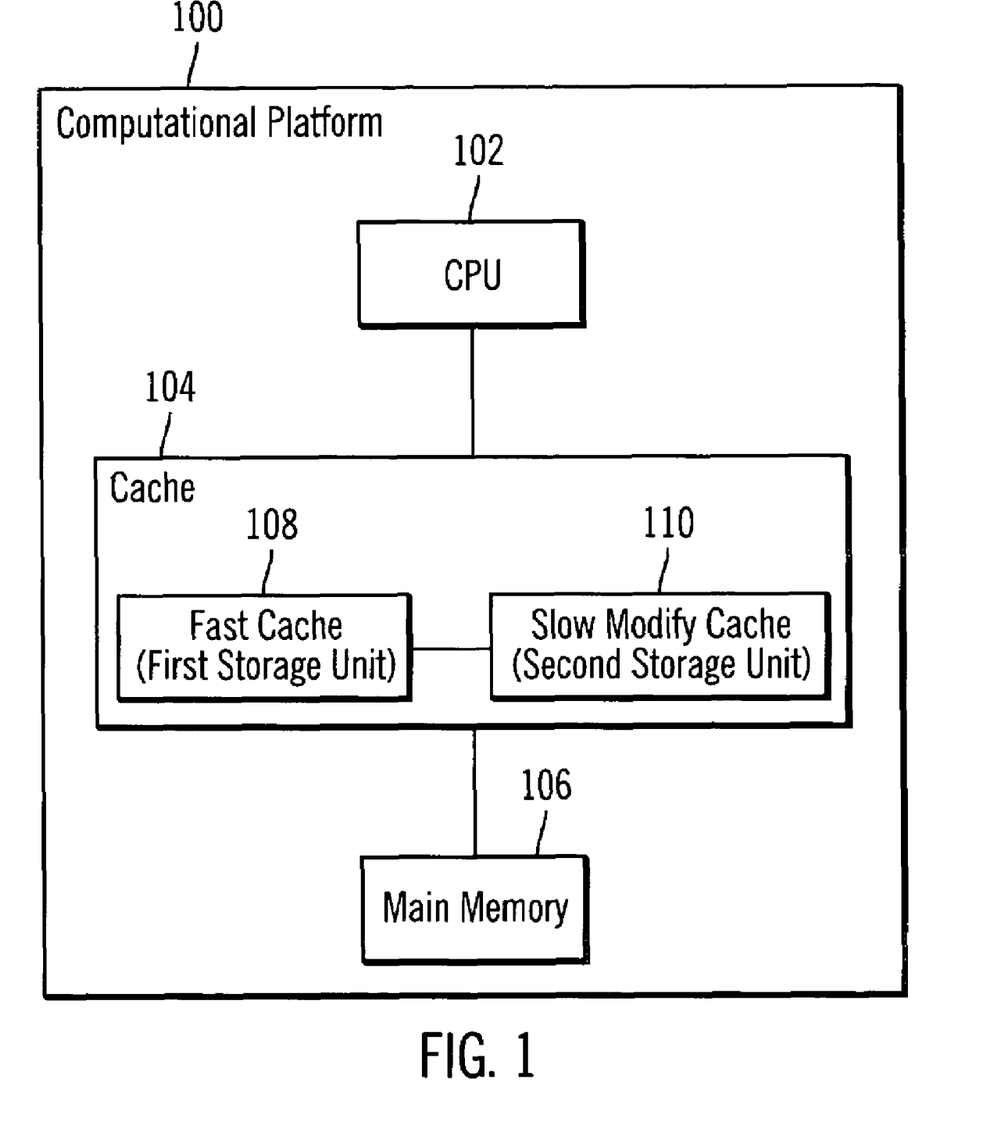
FIG. 1 illustrates a block diagram of a computing environment, in accordance with certain embodiments.

FIG. 1 illustrates a computing environment in which certain embodiments are implemented. A computational platform 100 comprises a CPU 102, a cache 104, and a main memory 106.

The computational platform 100 may comprise any type of computational device, such as, a workstation, a desktop computer, a laptop, a mainframe, a telephony device, a hand held computer, etc. In certain embodiments, the computational platform 100 may be coupled to any network (not shown) known in the art, such as the Internet, an intranet, a Local Area Network (LAN), a Storage Area Network (SAN), etc.

The CPU 102 may include any processor, such as, the Intel* Pentium* microprocessor or the IBM* PowerPC* microprocessor. The CPU 102 is coupled to a memory cache, such as the cache 104, where the cache 104 is coupled to the main memory 106. In certain embodiments, the CPU 102 may perform data transfer operations faster with the cache 104 than with the main memory 106. In certain embodiments, the cache 104 may comprise an L1 or L2 cache, and the main memory 106 may comprise DRAM.

*IBM and PowerPC are registered trademarks or trademarks of IBM corporation.
*Intel and Pentium are registered trademarks or trademaks of Intel corporation.

The cache 104 may comprise a first storage unit, such as, a fast cache 108, and a second storage unit, such as, a slow modify cache 110. In certain embodiments, write operations can be performed faster on the fast cache 108 when compared to write operations on the slow modify cache 110. In certain embodiments, read operations with respect to the slow modify cache 110 can be performed at a speed that is comparable to read operations with respect to the fast cache 108. For example, in certain embodiments the slow modify cache 110 is at least as fast as the fast cache 108 with respect to the completion of read operations. Therefore, while the slow modify cache 110 is slower in speed than the fast cache 108 with respect to write operations, the slow modify cache 110 is comparable in speed to the fast cache 108 with respect to read operations. The qualifier "slow modify" is used with regard to the "slow modify" cache 110 because the slow modify cache 110 is slower in speed with respect to write operations, i.e., operations that modify the content of a cache, when compared to the fast cache 108.

While FIG. 1 illustrates the fast cache 108 and the slow modify cache 110 in a memory cache 104, in alternative embodiments the fast cache 108 and the slow modify cache 110 may be implemented in a disk cache. In certain embodiments, data that is likely to be frequently used may stored in the cache 104, such that, the data that is likely to be frequently used is accessible faster from the cache 104 in comparison to accessing the data from the main memory 106. Within the cache 104, write operations may be used to exclusively write to the fast cache 108, whereas read operations may be performed from the slow modify cache 110. In certain embodiments, read operations may also be performed from the fast cache 108.

In certain embodiments, the slow modify cache 110 may be less expensive than the fast cache 108 and may comprise a greater number of bytes of storage when compared to the fast cache 108. In certain alternative embodiments, in which the cache 104 is a cache for a secondary storage device, such as, a tape drive, the slow modify cache 110 may be a CD R/W storage and the fast cache 108 may be a disk storage.

In certain embodiments, the main memory 106 may be more affordable in price when compared to the cache 104. Additionally in certain embodiments, the cache 104 is physically closer to the CPU 102 in comparison to the main memory 106 and the cache 104 responds faster to the requests from the CPU 102 in comparison to the main memory 106.

Figure 2:
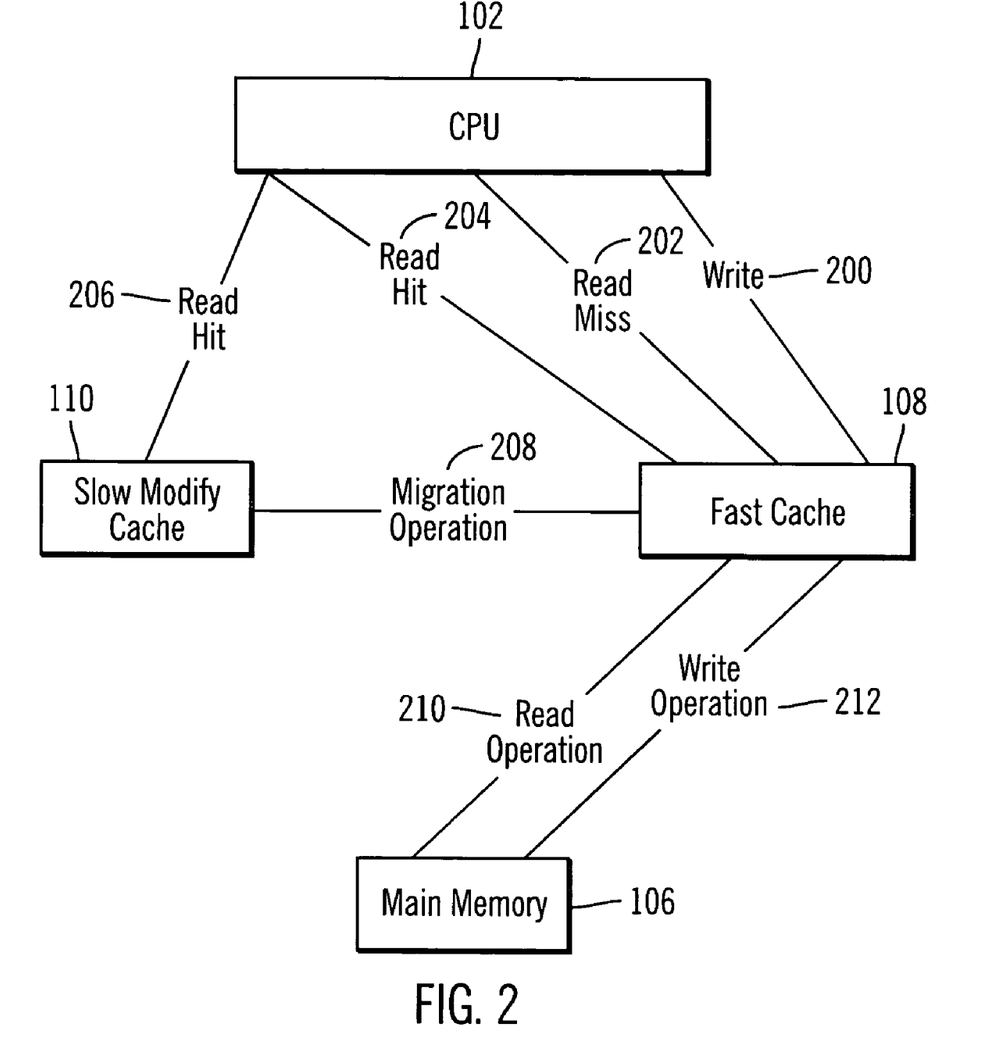
FIG. 2 illustrates a block diagram of a central processing unit coupled to a slow modify cache and a fast cache, in accordance with certain embodiments.

FIG. 2 illustrates a block diagram of the CPU 102 coupled to the slow modify cache 110 and the fast cache 108, in accordance with certain embodiments.

The slow modify cache 110, the fast cache 108, and the main memory 106 may be referred to as memory units. A request to read data from a memory unit, where the request can be satisfied by the memory unit may be referred to as a read hit. A request to read data from a memory unit, where the request cannot be satisfied by the memory unit may be referred to as a read miss. A write is a request to write data to a memory unit.

In certain embodiments, a request from the CPU 102 to the fast cache 108 can result in a write 200, a read miss 202, or a read hit 204. Therefore, the CPU 102 is capable of performing read and write operations with respect to the fast cache 108. The CPU 102 is also capable of generating requests that result in a read hit 206 on the slow modify cache 110.

In certain embodiments, a migration operation 208 that transfers data from the fast cache 108 to the slow modify cache 110 may be performed. In certain embodiments, the slow modify cache 110 may include a greater capacity for storage of data in comparison to the fast cache 108. In such a case, data may be transferred from the fast cache 108 to the slow modify cache 110. In certain embodiments, no copy of the transferred data is kept in the fast cache 108. Therefore, space is freed in the fast cache 108 when data is transferred to the slow modify cache 110. The freed space in the fast cache 108 may be used for writing additional data in the fast cache 108.

In certain embodiments, the slow modify cache 110 and the fast cache 108 are faster than the main memory 106. In such embodiments, when a read request cannot be satisfied from the slow modify cache 110 or the fast cache 108, a read request may be sent to the main memory 106 for the corresponding data, i.e., in the event of the a read miss 202, a read operation 210 may be performed on the main memory 106 to read the data. A write operation 212 may write data from the fast cache 108 to the main memory 106.

In certain embodiments, the slow modify cache 110 and the fast cache 108 may be considered to the be at the same level of cache, e.g. both the slow modify cache 110 and the fast cache 108 may comprise L2 cache. The main memory 106 is at a level that is slower to access than the slow modify cache 110 and the fast cache 108. Write operations are fulfilled by the fast cache 108, whereas read operations may be fulfilled by the slow modify cache 110 or the fast cache 108.

In certain embodiments, in which the slow modify cache 110 has a greater storage capacity than the fast cache 108, transferring data to the slow modify cache 110 may allow a greater amount of data to be accessed faster by the CPU 102, in comparison to embodiments in which the slow modify cache 110 is absent and the data that is transferred to the slow modify cache 110 is stored and accessed from the main memory 106.

Figure 3:
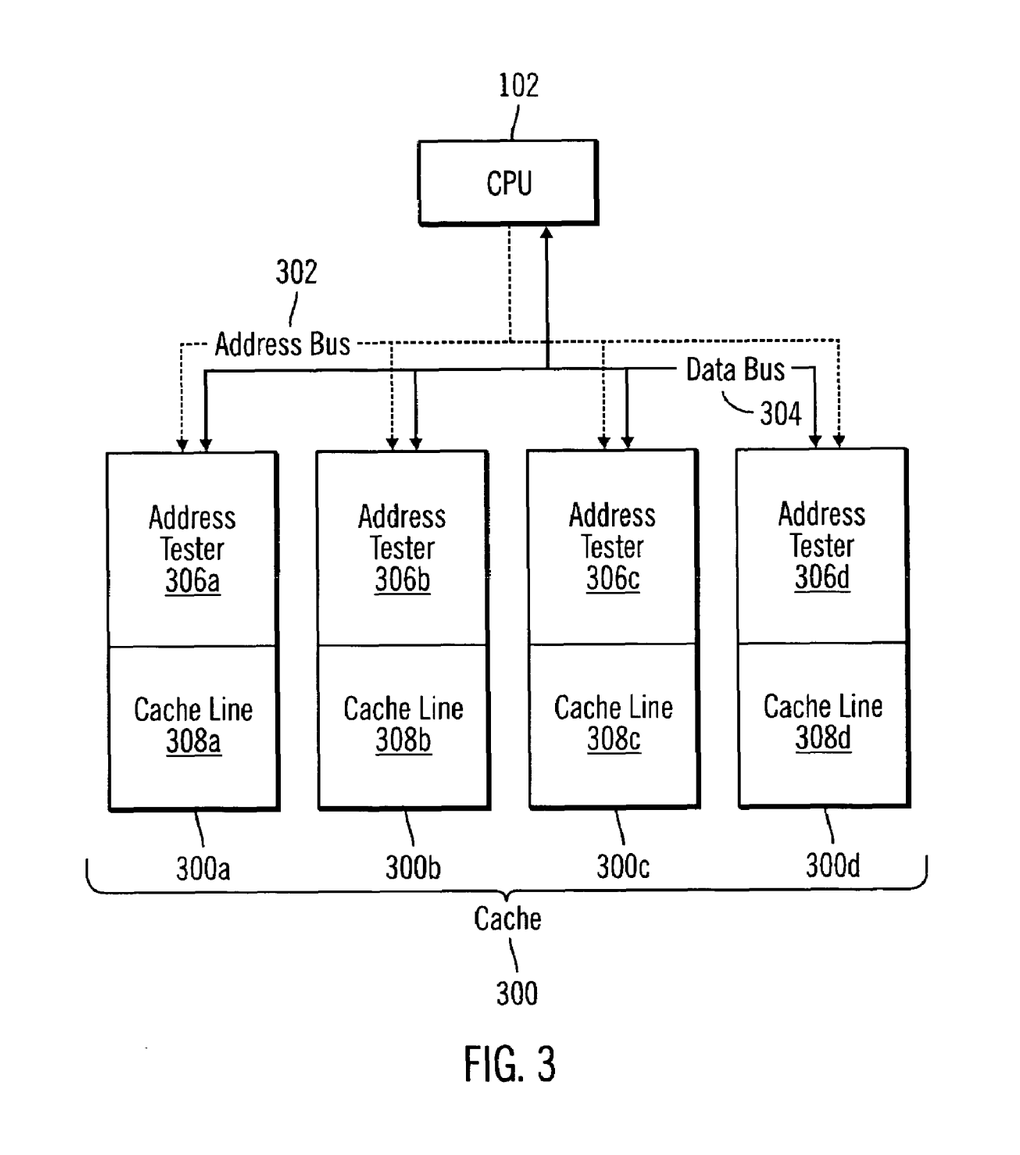
FIG. 3 illustrates a block diagram that illustrates how data transfer operations are performed with respect to elements of a cache, in accordance with certain embodiments.

FIG. 3 illustrates a block diagram that illustrates how data transfer operations are performed from the CPU 102 with respect to elements of a cache 300, where the cache 300 may comprise the slow modify cache 110 or the fast cache 108, in accordance with certain embodiments.

In certain embodiments, the cache 300 may comprise of four exemplary cache elements 300a, 300b, 300c, 300d. In alternative embodiments, the cache 300 may comprise of a greater or a lesser number of cache elements.

The CPU 102 is capable of communicating with the cache 300 via an address bus 302 and a data bus 304. Each cache element is comprised of an address tester and a cache line. For example, the cache element 300a is comprised of the address tester 306a and the cache line 308a, the cache element 300b is comprised of the address tester 306b and the cache line 308b, the cache element 300c is comprised of the address tester 306c and the cache line 308c, and the cache element 300d is comprised of the address tester 306d and the cache line 308d.

The address bus 302 is unidirectional and carries addresses from the CPU 102 to the cache elements 300a, 300b, 300c, 300d. The data bus 304 may be bidirectional and may carry data from the CPU 102 to the corresponding cache line on writes, and may carry data from a cache line to the CPU 102 on reads. An address tester for a cache element checks to determine if the address on the address bus 302 is the same as the address of the data in the cache line. For example, the cache line 308a may store the data corresponding to the address 56A6. In such a case, if the address bus 302 conveys the address 56A6, then the address tester 306a may determine that the cache line 308a has the data corresponding to the address 56A6.

In certain embodiments, the CPU 102 sends an address on the address bus 302 to the cache 300. The address testers 306a, 306b, 306c, 306d may determine whether at least one cache line of the plurality of cache lines 308a, 308b, 308c, 308d stores the data corresponding to the address on the address bus 302. If at least one cache line of the plurality of cache lines 308a, 308b, 308c, 308d stores the data corresponding to the address, then the CPU 102 may perform a read or write operation with respect to the at least one cache line that stores the data corresponding to the address.

Figure 4:
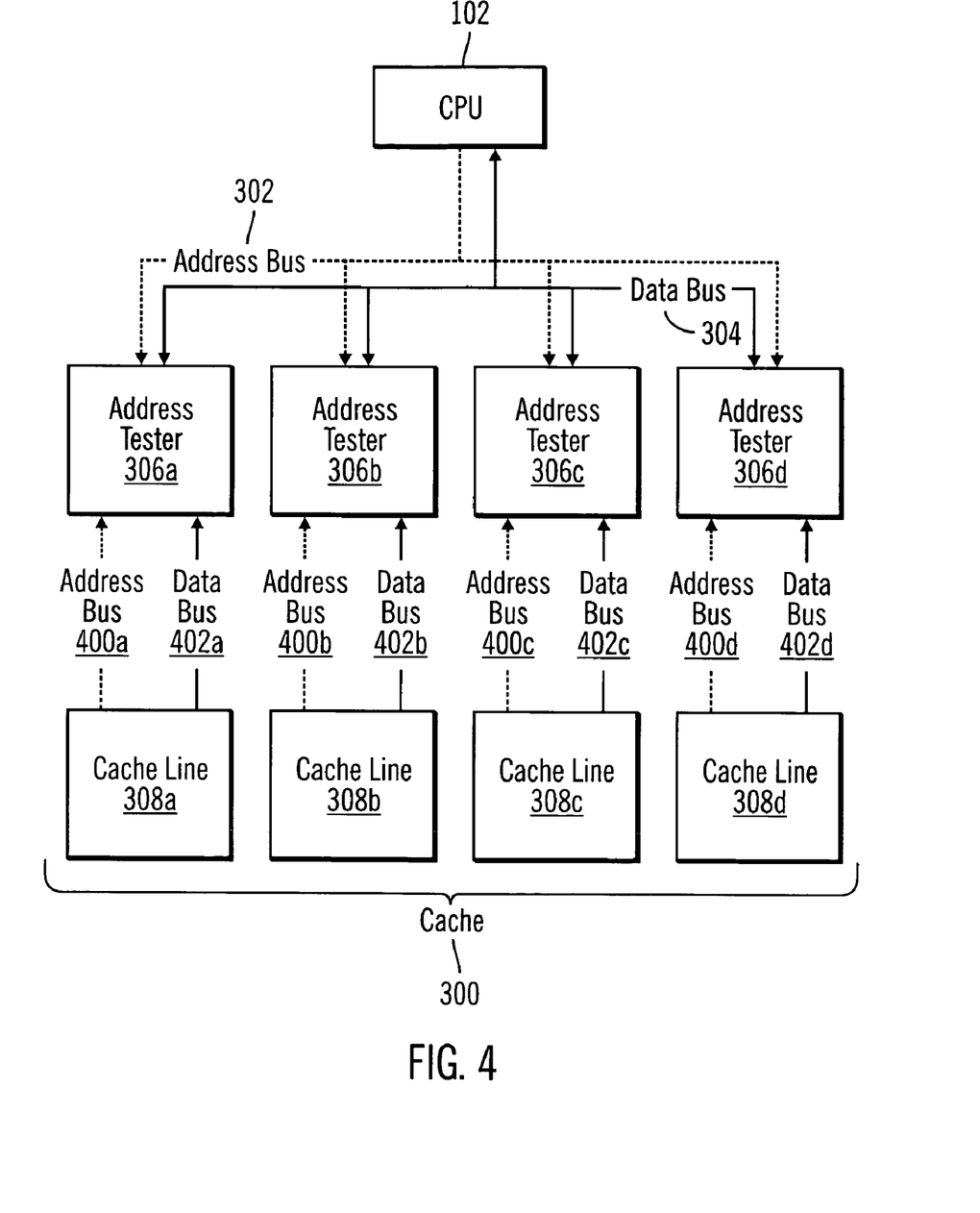
FIG. 4 illustrates a block diagram that illustrates how read hits are processed by elements of a cache, in accordance with certain embodiments.

FIG. 4 illustrates a block diagram that illustrates how read hits are performed with respect to elements of the cache 300, in accordance with certain embodiments. In certain embodiments, the cache 300 may be the slow modify cache 110 or the fast cache 108.

In certain embodiments, the cache lines are coupled to corresponding address testers via an address bus and a data bus. For example, the cache line 308a is coupled to the address tester 306a by the address bus 400a and the data bus 402a, the cache line 308b is coupled to the address tester 306b by the address bus 400b and the data bus 402b, the cache line 308c is coupled to the address tester 306c by the address bus 400c and the data bus 402c, and the cache line 308d is coupled to the address tester 306d by the address bus 400d and the data bus 402d. The address buses 400a, 400b, 400c, 400d are capable of conveying the address of the data stored in the corresponding cache lines 308a, 308b, 308c, 308d to the corresponding address testers 306a, 306b, 306c, 306d. The data buses 402a, 402b, 402c, 402d are capable of conveying the data stored in the corresponding cache lines 308a, 308b, 308c, 308d to the corresponding address testers 306a, 306b, 306c, 306d.

While the block diagram shows that an address bus and a data bus couples a cache line to the address tester, in alternative embodiments the coupling may be implemented differently. For example, one or more lines between an address tester and a cache line may be used to communicate an address and the corresponding data between the address tester and the cache line.

In certain exemplary embodiments, the CPU 102 may send a read request to the cache 300. The read request may be for an address that is transmitted by the CPU 102 on the address bus 302. The address bus 302 conveys the address to the address testers 306a, 306b, 306c, 306d.

The address testers 306a, 306b, 306c, 306d determine via the corresponding address buses 400a, 400b, 400c, 400d and the corresponding data buses 402a, 402b, 402c, 402d whether the corresponding cache lines 308a, 308b, 308c, 308d store the data corresponding to the address on the address bus 302. If so, a read hit has occurred and the stored data is sent to the CPU 102 via the data bus 304.

Figure 5:
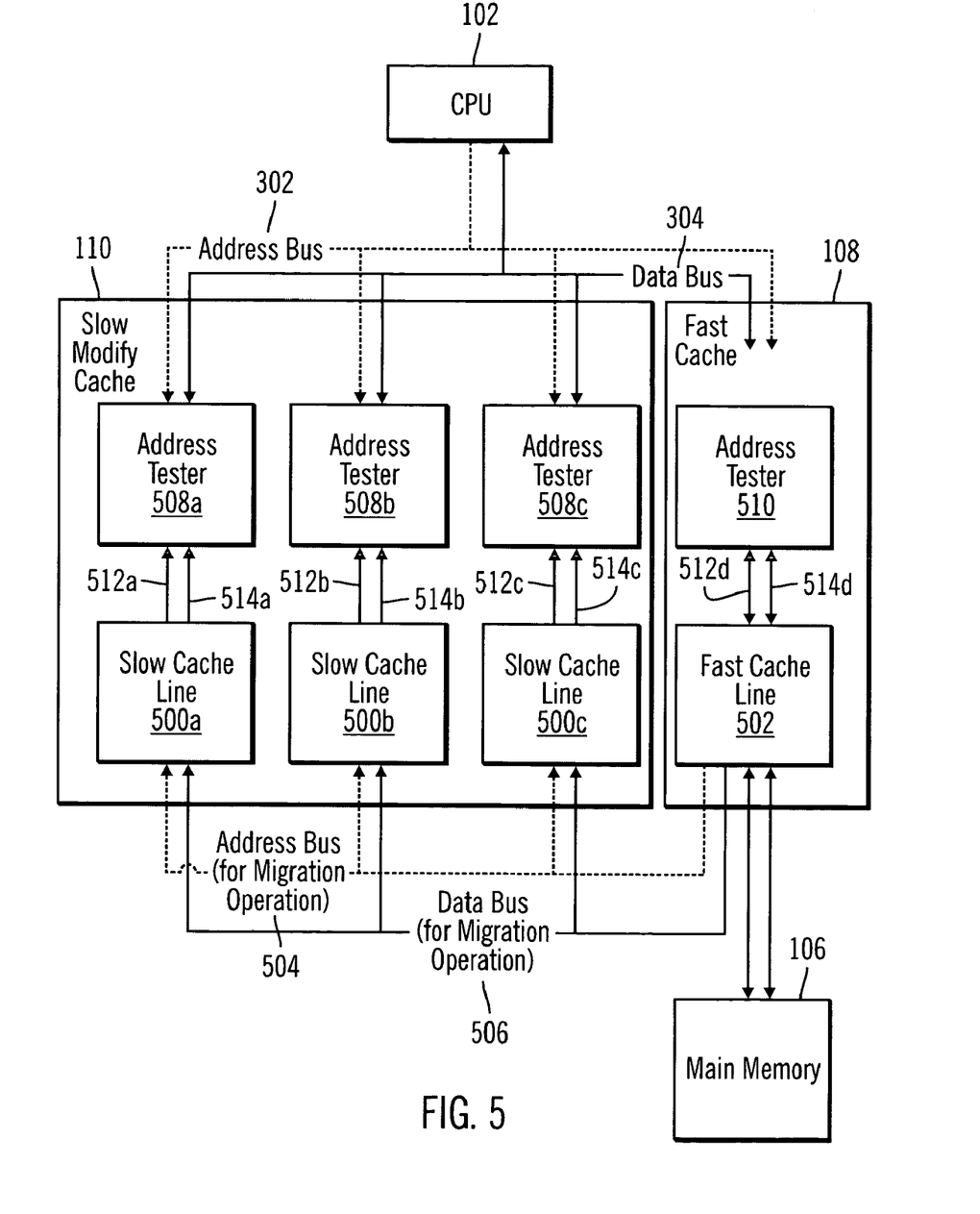
FIG. 5 illustrates a block diagram that illustrates how data transfer operations are performed with respect to a slow modify cache and a fast cache, in accordance with certain embodiments.

FIG. 5 illustrates a block diagram that illustrates how data transfer operations are performed between the slow modify cache 110 and the fast cache 108, in accordance with certain embodiments.

In certain embodiments, the slow modify cache 110 may include three cache elements comprising slow cache lines 500a, 500b, 500c and the fast cache 108 may include one cache element comprising a fast cache line 502. In alternative embodiments, the number of cache elements in the slow modify cache 110 and the fast cache 108 may be different. An address bus 504 that is used for the migration operation 208 from the fast cache 108 to the slow modify cache 110 couples the fast cache line 502 of fast cache 108 to the slow cache lines 500a, 500b, 500c of the slow modify cache 110. Additionally, a data bus 506 that is also used for the migration operation 208 from the fast cache 108 to the slow modify cache 110 couples the fast cache line 502 of fast cache 108 to the slow cache lines 500a, 500b, 500c of the slow modify cache 110. The address bus 504 and the data bus 506 allow the migration of data from the fast cache 108 to the slow modify cache 110 via the migration operation 208. Once data is transferred to the slow modify cache 110, the data is no longer present in the fast cache 108.

Address testers 508a, 508b, 508c correspond to the slow cache lines 500a, 500b, 500c respectively, and the address tester 510 corresponds to the fast cache line 502. Address lines 512a, 512b, 512c and data lines 514a, 514b, 514c couple the slow cache lines 500a, 500b, 500c to the address testers 508a, 508b, 508c. Additionally, the address line 512d and the data line 514d couple the fast cache line 502 to the address tester 510.

In certain embodiments, the CPU 102 loads an address corresponding to a read request on the address bus 302. The address bus 302 conveys the read request to the address testers 508a, 508b, 508c of the slow modify cache 110 and the address tester 510 of the fast cache 108. The address testers 508a, 508b, 508c, 510 may respond to the read request on the address bus 302 by using the corresponding cache lines 500a, 500b, 500c, 502 respectively. In certain embodiments, the data corresponding to the read request may be found in the slow modify cache 110. In certain embodiments, the CPU 102 may also use the address bus 302 and the data bus 304 to write data corresponding to an address on the address bus 302 in the fast cache 108.

If the data cannot be found in the slow modify cache 110 or the fast cache 108, i.e., a read miss has occurred, then the CPU 102 may obtain the data from the main memory 106, where the data passes through the fast cache 108.

Therefore, FIG. 5 illustrates an embodiment in which the CPU 102 can cache data in a slow modify cache 110 and a fast cache 108 that are at the same level. Write operations are performed on the fast cache 108 and read operations may be performed on the slow modify cache 110 and the fast cache 108. Periodically, the fast cache 108 may migrate data to the slow modify cache 110. In certain embodiments, the fast cache 108 may be more expensive to manufacture and may be smaller in size than the slow modify cache 110.

Figure 6:
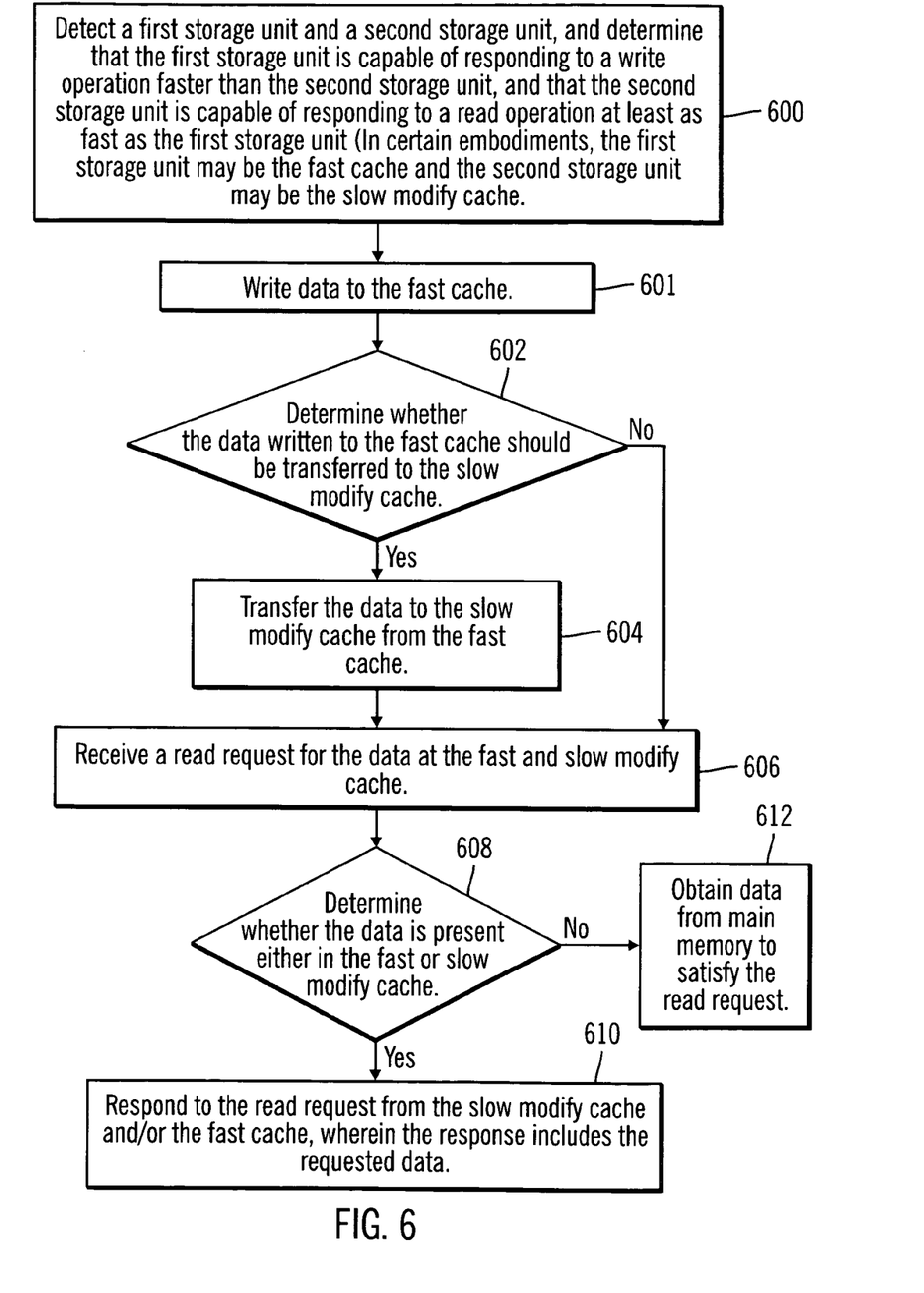
FIG. 6 illustrates operations for performing data transfer operations with respect to a slow modify cache and a fast cache, in accordance with certain embodiments.

FIG. 6 illustrates operations for performing data transfer operations with respect to the slow modify cache 110 and the fast cache 108, in accordance with certain embodiments. The operations may be implemented in program, logic or circuitry associated with CPU 102, the fast cache 108, and the slow modify cache 110.

Control starts at block 600, where a first storage unit that and a second storage unit are detected. A determination is made that the first storage unit is capable of responding to a write operation faster than the second storage unit, and that the second storage unit is capable of responding to a read operation at least as fast as the first storage unit. Therefore, the first storage unit may comprise the fast cache 108 and the second storage unit may comprise the slow modify cache 110.

Subsequently, the CPU 102 writes (at block 601) data to the fast cache 108. A determination (at block 602) is made as to whether the data written to the fast cache 108 is to be transferred via the migration operation 208 to the slow modify cache 110. In certain embodiments, the decision to perform the migration operation 208 may be taken to save space in the fast cache 108 for write operations from the CPU 102.

If at block 602, a determination is made that the data written to fast cache 108 is to be transferred to the slow modify cache 110, then the data is transferred (at block 604) to the slow modify cache 110 from the fast cache 108. For example, in certain embodiments, the data may be transferred via the migration operation 208 from the fast cache line 502 of the fast cache 108 to one of the slow cache lines 500a, 500b, 500c of the slow modify cache 110, where the transfer takes place over the address bus 504 and the data bus 506. Control proceeds to block 606 for subsequent operations after the data is transferred at block 604. Control also proceeds to block 606 for subsequent operations, if a determination (at block 602) is made that the data written to the fast cache 108 is not to be transferred to the slow modify cache 110.

Subsequently, the slow modify cache 110 and the fast cache 108 may receive (at block 606) a read request for the data from the CPU 102. A determination (at block 608) is made as to whether the data is present either in the fast cache 108 or the slow modify cache 110. In certain exemplary embodiments, determining the presence of the data may include using the corresponding address testers 508a, 508b, 508c, 510 and the cache lines 500a, 500b, 500c, 502.

If a determination (at block 608) is made that the data is present either in the fast cache 108 or the slow modify cache 110 then a response (at block 610) is made to the read request from the slow modify cache 110 and/or the fast cache 108, where the response includes the requested data. In certain embodiments, in which the requested data has been transferred to the slow modify cache 110, the data may be returned from the slow modify cache 110. In other embodiments, in which the requested data has not been transferred to the slow modify cache 110, the data may be returned from the fast cache 108.

If a determination (at block 608) is made that the data is absent in both the fast cache 108 and the slow modify cache 110 then the requested data is obtained (at block 612) from the main memory 106 to satisfy the read request.

Therefore, FIG. 6 illustrates an embodiment in which a slow modify cache 110 is used to increase the size of the cache 104 by using memory that is more affordable than the fast cache 108, where read operations may be performed at comparable speeds on the fast cache 108 and the slow modify cache 110.

Write operations on the fast cache 108 are faster than write operations on the slow modify cache 110. In certain embodiments, the slow modify cache 110 may be less expensive to manufacture per unit of memory when compared to the fast cache 108 because write operations are slower on the slow modify cache 110. Therefore, in certain embodiments, the slow modify cache 110 may be larger in storage capacity than the fast cache 108 to make the cache 104 affordable in price.

In certain embodiments the cache 104 is used for accelerating read operations by storing data in a slow modify cache 110 in preference to the main memory 106. Since the slow modify cache 110 may be manufactured less expensively than the fast cache 108, for a cache 104 of a predetermined storage capacity the cache 104 may be built less expensively when compared to building the cache 104 entirely out of fast cache 108. In certain embodiments, the manufacturing cost of the processor/cache combination represented by the CPU 102 and the cache 104 may be reduced by using the slow modify cache 110 in combination with the fast cache 108. In certain embodiments, where code is cached in the cache 104, the slow modify cache 110 may store the read only code to be reused over and over again without any modification. In alternative embodiments, the cache 104 may be a disk cache or some other type of cache besides a memory cache.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 7:
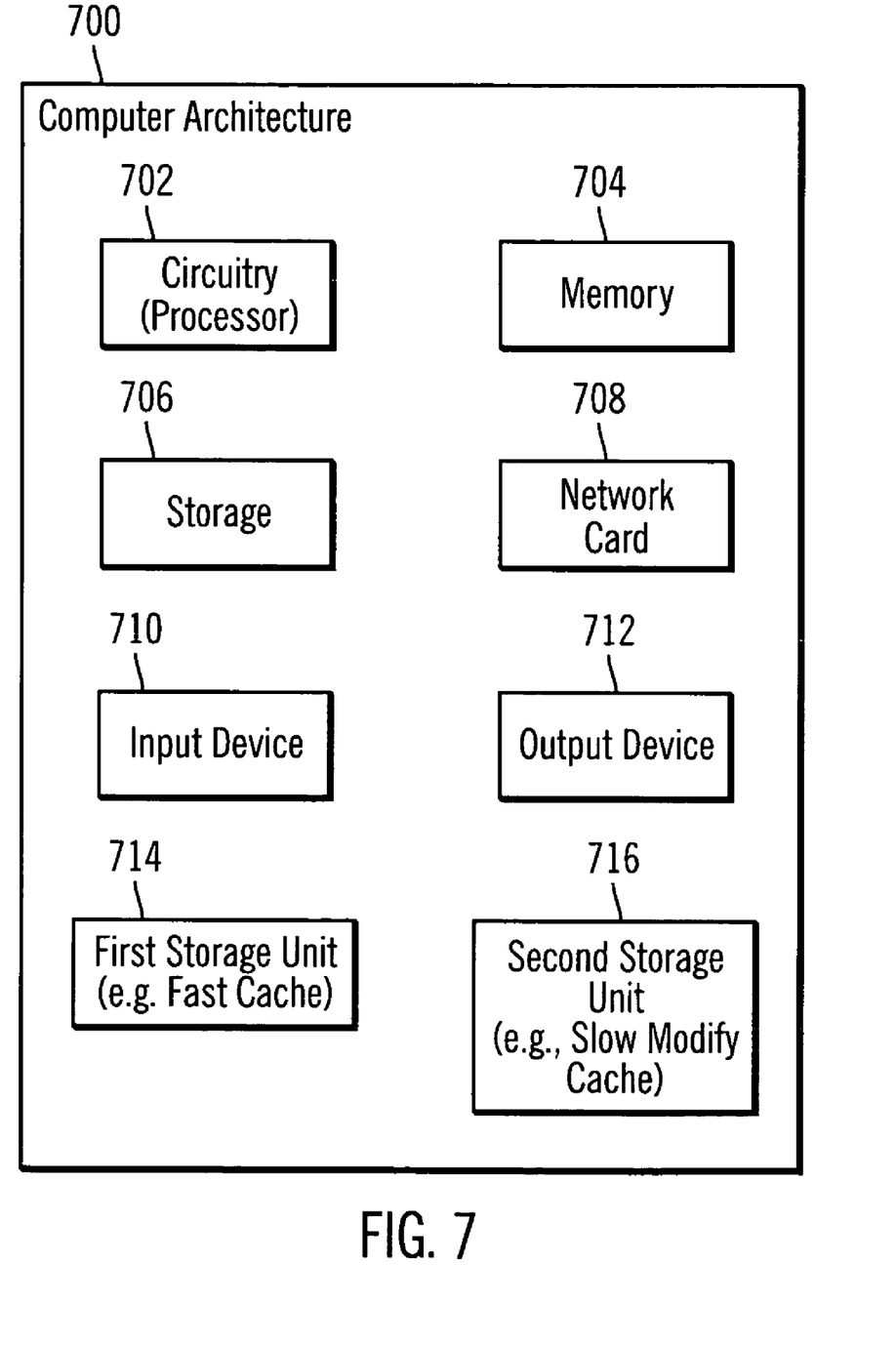
FIG. 7 illustrates a computing architecture in which certain embodiments are implemented.

FIG. 7 illustrates a block diagram of a computer architecture 700 in which certain embodiments may be implemented. In certain embodiments, the computational platform 100 may be implemented according to the computer architecture 700. The computer architecture 700 may include a circuitry 702 that may include a processor, a memory 704 (e.g., a volatile memory device), and storage 706. Certain elements of the computer architecture 700 may or may not be found in the computational platform 100. The storage 706 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 706 may comprise an internal storage device, an attached storage device and/or a network accessible storage device. Programs in the storage 706 may be loaded into the memory 704 and executed by the processor or circuitry 702. Additionally, the architecture may include a network card 708 to enable communication with a network. The architecture may also include at least one input device 710, such as, a keyboard, a touchscreen, a pen, voice-activated input, etc., and at least one output device 712, such as a display device, a speaker, a printer, etc. Additionally, the architecture 700, may comprise a first storage unit 714 that may correspond to the fast cache 108 and a second storage unit 716 that may correspond to the slow modify cache 110. In certain embodiments the processor 702 may correspond to the CPU 102 of the computational platform 100, and the memory 704 may correspond to the main memory 106 of the computational platform.

At least certain of the operations of FIG. 6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   detecting a first storage unit that is coupled to a second storage unit, wherein an address bus and a data bus couples the first storage unit to the second storage unit, wherein the first and second storage units comprise a plurality of address testers and a plurality of cache lines, and wherein those cache lines of the plurality of cache lines that are included in the first storage unit perform operations faster in comparison to those cache lines of the plurality of cache lines that are included in the second storage unit;
   determining that the first storage unit is capable of responding to a write operation faster than the second storage unit, and that the second storage unit is capable of responding to a read operation at least as fast as the first storage unit;
   writing data to the first storage unit;
   loading an address corresponding to the data in the address bus;
   loading the data in the data bus;
   transferring the address and the data via the address bus and the data bus from the first storage unit to the second storage unit by:
     (i) moving the address from a first cache line in the first storage unit to a second cache line in the second storage unit;
     (ii) moving the data from the first cache line in the first storage unit to the second cache line in the second storage unit; and
     (iii) deleting the data in the first cache line, wherein the data is periodically moved from the first storage unit to the second storage unit, wherein the first storage unit is more expensive to manufacture than the second storage unit; and
   reading the data from the second storage unit, in response to a read request directed at both the first and the second storage units, wherein the first storage unit and the second storage unit comprise a cache that is capable of coupling a processor to a main memory, wherein the first storage unit in the cache has a direct connection to the main memory, wherein the second storage unit in the cache has no direct connection to the main memory, wherein the first and second storage units comprise one cache level, wherein the operations further comprise moving the data from the cache to the main memory, and reading the data from the main memory in response to a read miss from the cache.

2. The method of claim 1, the method further comprising:
   deleting the data in the first storage unit after the data has been transferred to the second storage unit, wherein space released by deleting the data in the first storage unit is used for writing additional data in the first storage unit.

3. The method of claim 1, wherein the first storage unit is coupled to the processor via at least one address bus and at least one data bus, and wherein writing data to the first storage unit comprises:
   loading an address corresponding to the data in the at least one address bus;
   loading the data in the at least one data bus; and
   writing the data and the address in at least one cache line, wherein an address tester is capable of transmitting the data and the address to the at least one cache line.

4. The method of claim 1, wherein the cache is an L1 cache, and wherein the first and the second storage units are implemented by static random access memory.

5. The method of claim 1, wherein the second storage unit is larger and is capable of storing a greater amount of data than the first storage unit.

* * * * *